United States Patent Office 2,757,748
Patented Aug. 7, 1956

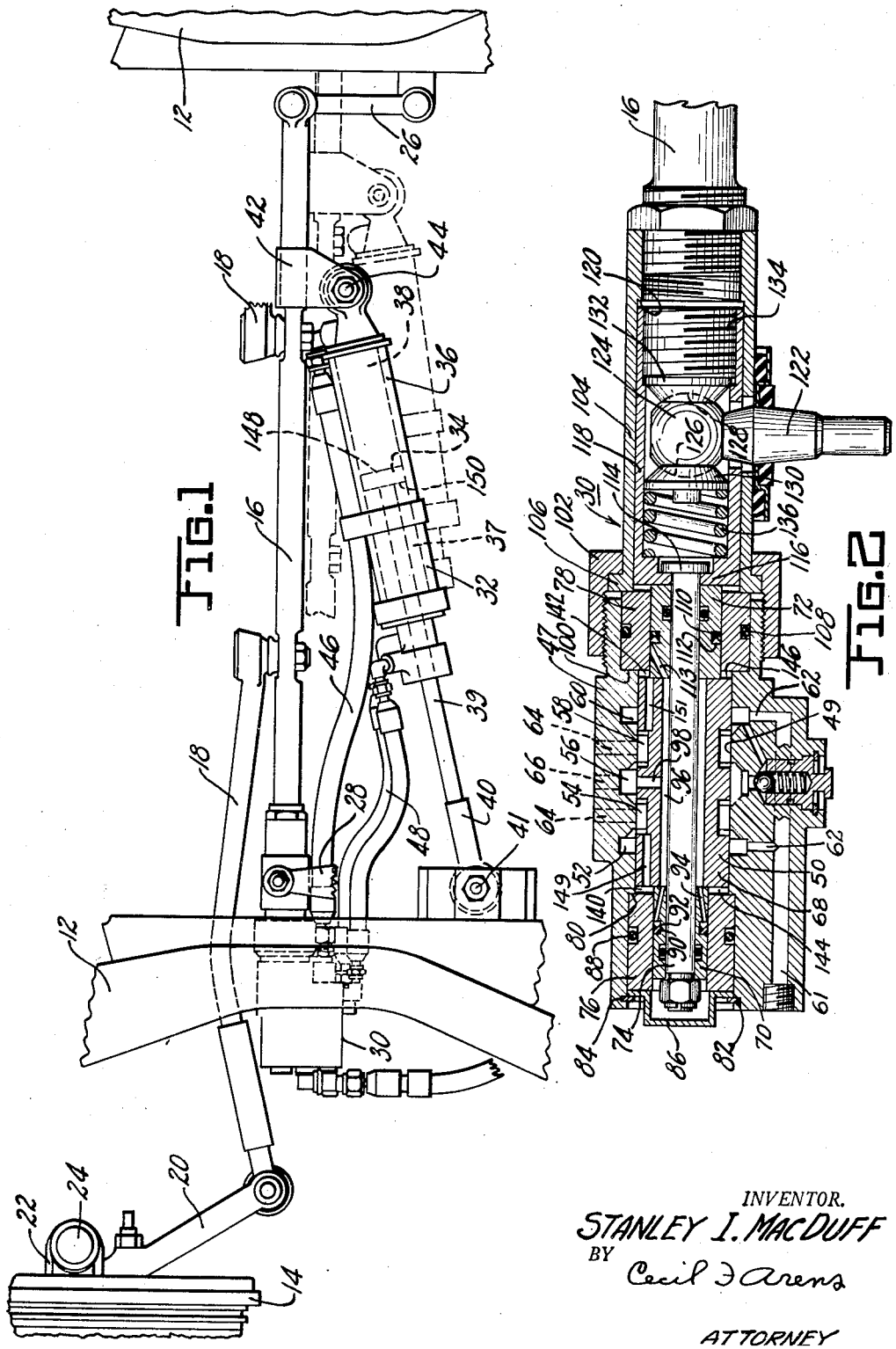

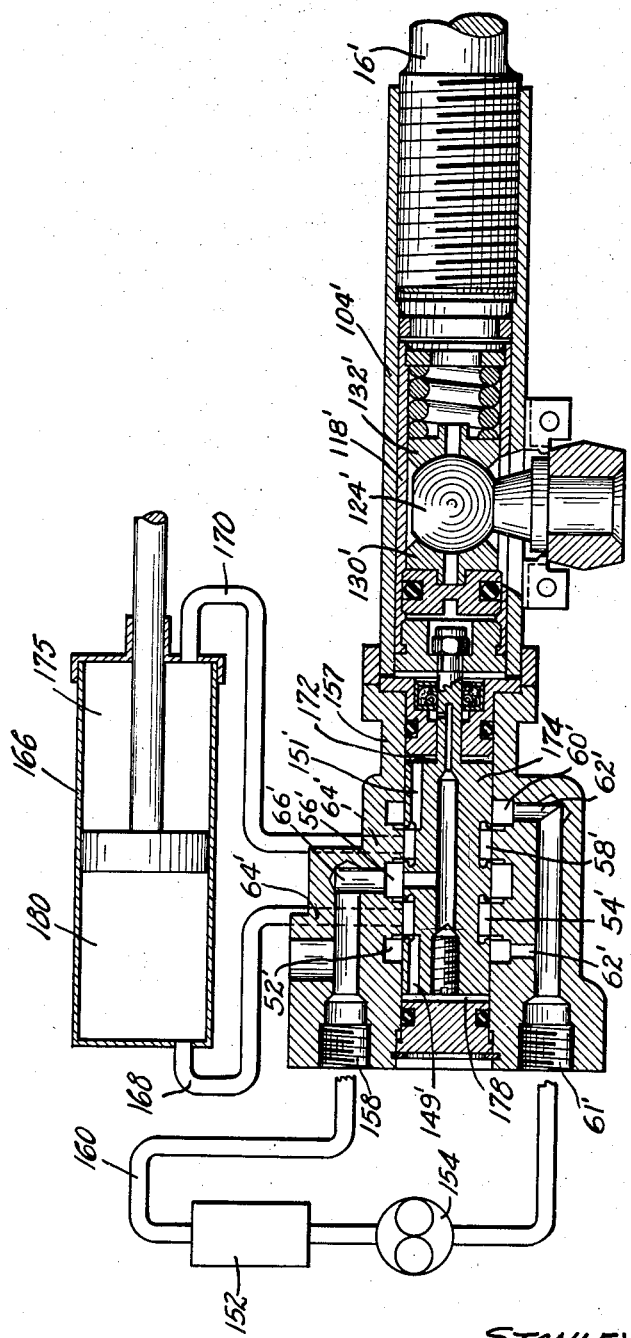

2,757,748

POWER STEERING APPARATUS OF THE HYDRAULIC TYPE HAVING A VALVE WITH UNEQUAL REACTION AREAS

Stanley I. MacDuff, South Bend, Ind., assignor to Bendix Aviation Corporation, South Bend, Ind., a corporation of Delaware Application January 3, 1952, Serial No. 264,814

14 Claims. (Cl. 180—79.2)

This invention concerns hydraulic power steering for vehicles.

It is an object of the invention to provide novel valve means for use in a power steering system or other servo-mechanism.

Another object resides in the provision of a control valve in which two valve members, each movable with respect to the other, are opposed from movement away from a neutral position by hydraulic reaction means including unequal reaction areas associated with said members and acted upon by a variable pressure.

A still further object resides in the provision of a control valve in which two valve members, each movable with respect to the other, are opposed from movement away from a neutral position by variable pressure chamber means embracing movable walls of different effective areas movable with one of said members.

Another important object resides in the provision of a control valve in which two valve members, each movable with respect to the other, are opposed from movement away from neutral by hydraulic reaction means including two pressure chambers, one located at each end of one of the valve members and having movable walls of unequal reaction areas associated with one of said members.

A further object of the invention resides in the provision of a steering mechanism comprising a control valve and a fluid motor having a predetermined relationship between the parts thereof so as to require the same amount of driver effort to overcome a given resistance to the wheels regardless of the position of the wheels.

A still further object of the invention is to provide a fluid motor with a piston therein whose areas at the opposite ends are unequal but which bear the same area relationship respectively to unequal areas at the ends of a valve member located in a control valve for controlling flow to the fluid motor.

The above and other objects and features of the invention will be apparent from the following description of the apparatus taken in connection with the accompanying drawings which form a part of this specification, and in which:

Figure 1 is a schematic illustration of the steering apparatus incorporating the novel invention;

Figure 2 is a view in section of the novel valve used in the steering apparatus; and Figure 3 is a view in section of a modified form of valve.

With reference to the accompanying drawings, a vehicle frame is illustrated at 12 and is provided with dirigible wheels and steering mechanism in accordance with standard automotive practice. The chassis 12 is carried on dirigible wheels 14, only one of which is shown. The vehicle is provided with the usual steering linkage comprising a cross tie rod 16, side links 18, connecting the tie rod to steering arms 20, only one of which is shown, a wheel spindle 22, integrally related to the steering arm, and a king pin 24, carried by the wheel spindle for pivotally supporting the dirigible wheel or steered part 14. One end of the cross tie rod 16 is supported on the chassis by an idler lever 26, and the other end of the tie rod is supported from a pitman arm 28, drivably related to a steering column and wheel not disclosed herein, for manually steering the vehicle.

A control valve 30 is interposed in the linkage between the cross tie rod 16 and the pitman arm 28, for controlling the flow of fluid under pressure to a fluid motor 32. The fluid motor 32 embraces a piston 34 and a cylinder element 36, the former of which divides the fluid motor into opposed chambers 37 and 38. The piston element 34 is connected to the chassis through rod 39, link 40, and bolt 41, thus permitting the motor to swing about bolt 41. The cylinder element 36 is attached to the cross tie rod 16 by any suitable means, such as bracket 42. The cylinder element 36 is connected to the bracket 42 by a bolt 44, which passes through the bracket so as to provide an articulated connection between the bracket and cylinder element. Conduit connections 46 and 48 provide for the transfer of fluid under pressure from the control valve to the opposed chambers 37 and 38 of the fluid motor.

The control valve 30 comprises a housing 47, provided with a bore 49, having a valve member 50 therein, slidably positionable in opposite directions from a normally neutral position, shown in Figure 2, for controlling flow to the fluid motor 32. The term "neutral position" where used in the specification in connection with the valve member refers to the position of the valve member during nonsteering. The valve member 50 and cylinder bore 49 are formed with annular channels 52, 54, 56, 58, and 60. The channels 54 and 58, located in valve member 50, are of such width that free communication between the channel 56 and the channels 54 and 58 is established with the valve member in its neutral position. The channels 52 and 60 are in communication with inlet port 61 via passages 62. The channels 54 and 58 are connected to working ports 64, and the channel 56 is connected to a reservoir port 66. The valve member 50 comprises a mid section 68, and end sections 70 and 72 held in assembled relationship by a bolt 74.

Bushings 76 and 78 are located in opposite ends of the housing 46 for slidably receiving end sections 70 and 72 respectively. The bushing 76 has its inner end abutting a shoulder 80 formed in the bore 49, and its outer end held against a split washer 82 retained in a groove 84, of the housing bore. The left end of the bore 49 is closed by a hat-shaped cover 86 having its brim interposed between the bushing 76 and the split washer 82. A seal 88 prevents leakage to atmosphere from between the bushing 76 and the housing 47. A V-shaped packing ring 90 is received in groove 92 and wipes the interior of the bushing 76. This packing ring 90 prevents leakage between the parts 70 and 76. The reservoir port 66 is communicated to the inner side of the V-shaped packing ring via passage 94, located in the end section 70, annular passage 96, and radial passage 98, to thereby provide lubrication for the end section 70 of the valve member and a leakage return path to the reservoir. The bushing 78 is held against shoulder 100, formed in the bore 48, by an external cap 102 which threadedly engages the housing 47. The housing is provided with an extension in the form of a tube 104 having a flanged end 106 turned outwardly to permit interposing the same between the cap 102 and the bushing 78. Bushing 78, like bushing 76, is equipped with a seal 108 to prevent leakage to atmosphere. Section 72 is also provided with a V-shaped packing ring 110 which wipes the interior of the bushing 78 and prevents leakage between parts 72 and 78 to atmosphere. The inner side of the packing ring 110, which is carried in a groove 112 of the end section 72, is communicated to the reservoir port 66 via the passage 113, the annular passage 96, and the radial passage 98. The right end of the bolt 74 is formed with an enlarged head 114 for engagement with an end 116 of a sleeve 118, slidably disposed in the tubular extension 104. The sleeve 118 is capable of sliding in the housing between the end of the bushing 78 and a shoulder 120 formed in the tube 104. The bolt 74 ties the sections 68, 70 and 72, and the sleeve 118 together for movement as a single member. The tube 104 and the sleeve 118 are provided with lateral openings for the reception of a ball stud 122, one end of which is connected to the pitman arm 28. The other end of the ball stud is formed with a rounded portion 124 which is carried in sockets 126 and 128 of members 130 and 132, respectively, located in the sleeve 118. A plug 134 urges the member 132 against members 122 and 130, which in turn preloads spring 136. The spring 136 is interposed between the end 116 of the sleeve 118 and the member 130. The spring 136 is sufficiently heavy to provide a relatively rigid connection between the valve member 50 and the manual steering means, only part of which is shown, which includes the pitman arm 28. As parts 122, 130 and 132 become worn the spring 136 expands an amount equal to the total wear of the parts. The cross tie rod 16 threadedly engages the end of the tubular member 104.

In the power steering apparatus herein disclosed the control valve and the fluid motor are so constructed and interrelated as to permit a vehicle to be steered in all directions with the same driver effort for a given wheel resistance. Chambers 140 and 142 are located at the ends of the valve member 50 between the latter and the housing 47. Unequal areas 144 and 146 are exposed to the chambers 140 and 142, respectively, and form movable walls thereof. The unequal areas 144 and 146 have a definite relationship to the areas 148 and 150, respectively, disposed at opposite ends of the piston or movable member 34. Communication is established between the chamber 38 of the fluid motor, having the larger of the unequal areas of the movable member exposed thereto, and the chamber 140 of the control valve, having the larger of the unequal areas of the valve member exposed thereto, via passage 149, annular channel 54, left hand working port 64 and the connection 46. Communication is established between the chamber 37 of the fluid motor, having the smaller of the unequal areas of the movable member exposed thereto, and the chamber 142 of the control valve, having the smaller of the unequal areas of the valve member exposed thereto, via the passage 151, annular channel 58, right hand working port 64 and the connection 48. The larger areas 144 and 148, exposed to the chambers 140 and 38, respectively, are in the same ratio with respect to each other as the smaller areas 146 and 150, exposed to the chambers 142 and 37, are to each other. It should be noted, however, that the ratios of the large and small areas may not always be the same. Moreover, under certain circumstances, depending upon the nature of the unbalance of forces in the steering geometry of the vehicle, the relationship shown in the drawings between the reaction areas of the valve to the piston areas may even be reversed.

Furthermore, since the areas 144 and 146 formed in the ends of the valve member have a definite relationship to the areas 148 and 150 formed in the ends of the piston, the valve reaction or steering effort required will have a direct relationship to the turning force applied to the wheels by the piston.

Figure 3 is a modified form of the control valve of Figure 2. The principal difference between the control valves resides in the construction and arrangement of the chambers disposed at the ends of the valve member. In describing Figure 3, all parts having functions similar to like parts in Figures 1 and 2 are given identical designating numbers with the addition of a prime ('). Fluid from a reservoir 152 is pressurized by a pump 154, the latter of which is connected to an inlet port or passage of the control valve 157. The control valve communicates with the reservoir 152 by way of channel 56', port 66', passage 158 and pipeline 160. The working ports 64' of the control valve communicate with opposite ends of the fluid motor 166 via connections 168 and 170. The fluid motor 166 may be connected to the steering linkage of Figure 2 in any suitable manner, such as shown. An annular chamber 172, located at the right end of valve member 174, is connected to chamber 175, located in the right end of the fluid motor 166, through passage 151' and connection 170. Chamber 178, located at the left end of the valve member 174, is in communication with chamber 180, located on the left end of the fluid motor, through passage 149' and connection 168. The difference between this valve and the one of Figure 2 is actually one of degree only. For example, chamber 178, located at the left end of the valve member 174, utilizes the entire end of the valve member as a pressure or reaction area and not just an annulus. However, the area of the left end of the valve member 174 is in a definite ratio to the area of the left end of the piston of the fluid motor 166. Also the area of the right end of the valve member 174 bears the same area relationship to the right end of the piston of the fluid motor 166. Functionally, the control valve of Figure 2 is identical with the valve of Figure 3 and is interchangeable therewith. In any event, regardless of which valve is to be used, the selection of the ratio of the areas is determined by the amount of effort believed desirable to overcome a predetermined wheel resistance. This, of course, is very flexible and can be made anything desired by varying the relationship of the areas as aforementioned.

Operation and function of the steering apparatus, using Figures 1 and 2 for the purposes of description, is as follows:

With the control valve in its neutral position, fluid under pressure from the source divides between inlet ports 62, from which the fluid flows to the reservoir port 66 by way of the annular channels 54 and 58, during periods of nonsteering. During this period fluid pressure is also acting in the ends of the fluid motor 32. Because of the unequal areas 144 and 146 at the ends of the valve member 50 which are exposed to chambers 140 and 142, respectively, there is a tendency for the valve member to shift to the right due to this unbalanced condition. However, in actual practice the valve member rests in a neutral position and in a balanced state, since the fluid under pressure admitted to the end of the member with the greater area moves the valve in a direction to cut off the pressure to that end of the valve member and at the same time opening the opposite end of the valve member to a greater pressure. Obviously at this time there is a smaller pressure of a predetermined value acting on a greater area at one end of the valve member and a greater pressure of a predetermined value acting on a smaller area at the opposite end of the valve member, to thereby maintain the valve member in hydraulic balance. Since the areas on either side of the piston are in the same ratio to their corresponding areas of the valve member, the same balanced condition exists in the fluid motor.

Movement of the valve member 50 from its neutral position reduces flow to one of the working ports 64 and increases flow in the other working port. For example, movement of the valve member to the right, in Figure 2, restricts flow to the annular channel 54 and to working port 64, on the left, and increases flow to the annular channel 58 and hence to the working port 64, on the right. This action of the valve connects the chamber 37 of the fluid motor to the increased flow through the overlapping space between the channels 58 and 60 and the chamber 38 of the fluid motor is connected to the reservoir via the overlapping space between the annular channels 54 and 56, thus causing movement of the steered part. With both the housing 46 of the control valve and the cylinder 36 of the fluid motor being connected to the cross tie rod 16, movement of the steered part will reposition the valve in its neutral position, hence a steering apparatus of the follow-up type is provided.

Movement of the valve member 50 to the right, as aforementioned, subjects the chamber 142 to a greater pressure because the overlap between the annular channels 58 and 60 is increased, and reduces the pressure in the chamber 140 since the overlap between the chambers 52 and 54 is reduced. Obviously, each of the chambers 140 and 142 located at the respective ends of the valve member will have a force developed therein which acts on the end of the valve member. The magnitude of the force will depend on the area of the valve member exposed to the chamber and the pressure in the chamber. The differential of these forces existing in the two chambers is utilized to restore the valve to its neutral position. If the valve member is not permitted to move, the reaction force is transmitted into the housing member where it is combined with the force applied to the tie rod through the action of the fluid motor to steer the vehicle. The differential force which is imparted to the valve member is felt by the operator of the vehicle and is commonly termed "feel." This reaction or "feel" which is transmitted to the driver of the vehicle gives the driver a sense of effort required for steering and may be varied by changing the effective areas of the ends of the valve member, while at the same time maintaining the most desirable ratios between those areas. In actual practice the steering geometry or steering linkage dictates to some extent the relationship of the areas. The particular arrangements shown are illustrative only.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. A valve for a servomotor comprising a movable valve member arranged in a housing in a position of hydraulic balance from which said member is shiftable in either direction for controlling flow, an inlet port, an outlet port, two working ports, said valve member being constructed and arranged so that when the valve is in hydraulic balance predetermined flows are established between the inlet and outlet ports via the working ports, opposed chambers formed in the ends of the housing with the latter and the valve member forming movable walls having opposed faces, passages in the valve member connecting the opposed chambers to the two working ports, the opposed faces of the movable walls of one of the chambers being of greater effective area than the corresponding faces of the movable walls of the other chamber, movement of said valve member out of its position of hydraulic balance creating differential pressures in the two working ports, which differential in pressures is transmitted to the respective chambers, and means for moving the valve member out of its position of hydraulic balance.

2. A valve of the character described comprising a housing with a valve member therein having a position of hydraulic balance from which it is movable, an inlet port, an outlet port, two working ports, said valve member being so constructed and arranged that when the valve is in hydraulic balance predetermined flows are established between the inlet and outlet ports via the working ports, opposed chambers located at each end of the valve member, a connection from each chamber to one of the working ports, each of said chambers being formed with opposed faces provided by the housing and valve member respectively, the opposed faces in one of the chambers being of greater effective area than the corresponding faces in the other chamber, movement of said valve member from its position of hydraulic balance creating differential pressures in the two working ports, said differential pressures being transmitted to said chambers where a force is developed in one of the chambers proportional to the differential in pressure and tending to restore the valve to said position of hydraulic balance, and means for moving the valve member away from its position of hydraulic balance.

3. A valve comprising two telescopically arranged relatively movable members having normally neutral positions of hydraulic balance with respect to each other, one of said members being shiftable in either direction from said neutral position for controlling flow, an inlet port, an outlet port, two working ports, said members being so constructed and arranged that when the valve is in neutral position predetermined flows are established between the inlet and outlet ports via the working ports, two chambers, one located at each end of one of said members, said chambers being formed with opposed faces provided by each of said members, the effective areas of the faces provided by one of said members being unequal, movement of said one member from its neutral position creating differential pressures in the two working ports, said differential pressures being transmitted to said chambers where a force is developed in one of said chambers proportional to the differential in pressure and tending to restore said valve to its neutral position, and means for moving said one member away from its neutral position.

4. A valve comprising a pair of slidingly telescoped inner and outer cylindrical valve members having normally neutral positions with respect to each other, one of said members being shiftable in opposite directions from its neutral position for controlling flow, an inlet port, an outlet port and two working ports, said valve members having formed in the cylindrical surfaces thereof channels communicating with the respective ports and establishing communication therebetween when said valve members are in their neutral position, means defining fluid pressure chambers at opposite ends of the inner valve member, one of said chambers having walls of greater effective area than the other of said chambers, the inner valve member being formed with passages communicating said chambers with the working ports, movement of said one valve member from its neutral position creating differential pressures in the working ports and in said chambers where a force is developed in one of said chambers proportional to the differential in pressure and tending to restore said one member to its neutral position, and means for moving said one valve member from its neutral position, the force developed in said one of said chambers having its reaction taken by said last-named means.

5. A valve comprising a housing member with a bore therein, a valve member in the bore, said members having normally neutral positions with respect to each other, an inlet port, two working ports, an outlet port, channels in the bore and valve member establishing communication with all of said ports when said members are in a neutral position, said members being relatively movable from said neutral position for controlling flow, chamber means in the housing member, said chamber means including movable walls of unequal effective areas associated with one of said members, passage means connecting said chamber means with said inlet port, and means connected to one of said members for establishing relative movement of said members from their neutral position, relative movement of said members from their neutral position creating a pressure in said chamber means acting on one or the other of said areas tending to restore the members to their neutral position.

6. A power steering mechanism for a vehicle having a steering wheel and a steering linkage, comprising a fluid pressure motor provided with housing and piston elements, one being connected to the vehicle, and the other being connected to said steering linkage, a follow-up control valve for said motor including a pair of valve members, one being connected for operation by the steering wheel, two working ports in the valve, fluid connections between the working ports and motor, and chamber means provided by the valve members, passage means connecting said chamber means to the two working ports, said chamber means comprising movable walls of unequal effective areas movable by one of said members and subject to a variable pressure upon motor energizing relative movement of said valve members for creating a force proportional to the force applied to the steering linkage and acting through said one valve member opposing movement by the steering wheel, said movable walls of unequal effective areas being operatively connected to the steering linkage and to the steering wheel in such manner and relationship that substantially equal steering effort is required at the wheel for a given angular movement thereof in either direction from straight ahead position of the vehicle regardless of unbalanced forces acting through the steering linkage.

7. A power steering mechanism for a vehicle having a steering wheel and a steering linkage, comprising a fluid pressure motor provided with housing and piston elements, one being connected to the vehicle, and the other being connected to said steering linkage, a follow-up control valve for said motor including a pair of valve members, one being connected for operation by the steering wheel, two working ports in the valve, fluid connections between the two working ports and motor, and fluid pressure reaction means provided by the valve members, passage means communicating the two working ports with said reaction means, said reaction means embracing movable walls of unequal effective areas carried by said valve members and subject to a variable pressure upon motor energizing relative movement of said valve members for creating a force opposing movement of said one valve member by the steering wheel, said movable walls of unequal effective areas being operatively connected to the steering linkage and to the steering wheel in such manner and relationship that substantially equal steering effort is required at the wheel for a given angular movement thereof in either direction from straight ahead position of the vehicle regardless of unbalanced forces acting through the steering linkage.

8. A follow-up valve comprising a housing member with a bore therein, a valve member in the bore, an inlet port, two working ports, an outlet port, said members being arranged in a neutral position from which they are relatively movable for controlling flow, channels in the bore and valve member establishing communication with all the ports when said members are in neutral, hydraulic reaction means formed by said members and subject to a pressure which varies upon relative movement of said members from neutral passage means in one of the members communicating the two working ports with the hydraulic reaction means, said reaction means embracing movable walls of unequal effective areas carried by one of said members, and operator operated means connected to one of said members for moving the same from neutral, movement of said one member from neutral being opposed by said variable pressure acting on one or the other of said areas depending upon the direction of movement of said members with respect to each other.

9. A valve comprising a body member, a bore in the body member, a movable valve member normally substantially hydraulically balanced in the bore, an inlet port, two working ports, an outlet port, channels in the bore and valve member communicating with all said ports when said members are in hydraulic balance, means located in said members tending to maintain said valve member in hydraulic balance in said bore and creating unequal pressures at the working ports, said means including chamber means having movable walls of unequal effective areas carried by said members and acted upon by pressure existing in said chamber means, means in one of said members communicating the two working ports to the chamber means, the pressure in said chamber means varying with movement of said valve member from hydraulic balance, and operator operated means for moving said valve member out of hydraulic balance and subject to pressure acting on said unequal areas.

10. A valve comprising inner and outer telescopically arranged members having normally neutral positions with respect to each other, one of said members being shiftable in either direction from its neutral position for controlling flow, an inlet port, an outlet port, two working ports, channels in the members communicating with the respective ports and establishing communication therebetween, two chambers, one located at each end of said inner member, the channels in the inner member being provided by a plurality of lands, one located at each end of said inner member adjacent the respective chambers and forming movable walls therefor, the effective area of the movable wall for one chamber beeing greater than that of the movable wall for the other chamber, passages in the lands forming the movable walls, said passages connecting the chambers to the channels appearing in the inner member, and means for moving said one member from its neutral position.

11. A valve comprising inner and outer telescopically arranged members having normally neutral positions with respect to each other, one of said members being shiftable in either direction from its neutral position for controlling flow, an inlet port, an outlet port, two working ports, channels in the members communicating with the respective ports and establishing communication therebetween, two chambers, one located at each end of said inner member, the channels in the inner member being provided by a plurality of lands, one located at each end of said inner member adjacent the respective chambers and forming movable walls therefor, the effective area of the movable wall for one chamber being greater than that of the movable wall for the other chamber, said plurality of lands forming two channels communicating with the two working ports, passages in the lands forming the movable walls, said passages connecting the chambers to the two channels respectively, and means for moving said one member from its neutral position.

12. For use in cooperation with a vehicle steering linkage having a member movable in opposite directions from a central position to effect turning of the vehicle to one side or the other: mechanism for applying operating force to said steering linkage comprising a fluid pressure motor having a cylinder and piston, one of which is connected to the vehicle body and the other of which is connected to the movable steering member, the cylinder and piston having a central position from which they are relatively movable in either direction by pressure fluid admitted to one side or the other of the piston for the purpose of urging the movable steering member in one direction or the other, the effective pressure responsive area of the piston being greater on one side than on the other; and a valve device comprising a housing member connected to and moved by the movable steering member, and a manually operated valve element in the housing member movable relative thereto in one direction to cause pressure fluid to act on one side of the piston and in the other direction to cause pressure fluid to act on the other side of the piston, said housing member having an inlet port, an outlet port and two working ports, said working ports being in communication respectively with the opposite ends of the cylinder, the housing member and valve element being so formed as to provide intercommunication of all of said ports when the valve element is in its neutral position and to cause an increase in the pressure at one working port when the valve element is moved in one direction and an increase in the pressure at the other working port when the valve is moved in the other direction, said valve element having two pressure responsive reaction surfaces which have unequal effective areas and each of which when subjected to increased pressure increasingly urges the valve element toward neutral position, with a force equal to the reaction force being transmitted by the housing member to the movable steering member to assist in steering the vehicle, the larger valve reaction surface being acted on by the same pressure as that acting on the larger area of the piston and the smaller valve reaction surface being acted on by the same pressure as that acting on the smaller area of the piston, the ratio of the effective areas of the valve reaction surfaces being such with respect to the geometry of the steering linkage that a given amount of manual effort will be required to overcome a predetermined steering resistance regardless of which direction from neutral the movable member is being operated.

13. For use in cooperation with vehicle steering linkage having a member movable in opposite directions from a central position to effect turning of the vehicle to one side or the other: mechanism for applying operating force to said steering linkage comprising a fluid pressure motor having a cylinder and piston, one of which is connected to the vehicle and the other of which is connected to the movable steering member, the cylinder and piston having a central position from which they are relatively movable in either direction by pressure fluid admitted to one side or the other of the piston for the purpose of urging the movable steering member in one direction or the other; a valve device comprising a housing member connected to and moved by the movable steering member, and a manually operated valve element in the housing member movable relative thereto in one direction to cause pressure fluid to act on one side of the piston and in the other direction to cause pressure fluid to act on the other side of the piston, said housing member having an inlet port, an outlet port and two working ports, said working ports being in communication respectively with the opposite ends of the cylinder, the housing member and valve element having interconnecting channels and passages so as to provide communication between all of the ports when the valve element is in its neutral position and to cause an increase in the pressure at one working port when the valve element is moved in one direction and an increase in pressure at the other working port when the valve element is moved in the other direction, said valve element having two pressure responsive reaction surfaces which have unequal effective areas and each of which when subjected to increased pressure increasingly urges the valve element toward neutral position with a force equal to the reaction force being transmitted by the housing member to the movable steering member to assist in steering the vehicle, and stops associated with the valve device to be engaged after movement of the valve element a predetermined amount in either direction from neutral to permit manual movement of said movable member, the ratio of the effective areas of the valve reaction surfaces being such with respect to the geometry of the steering linkage that a given amount of manual effort will be required to overcome a predetermined steering resistance regardless of which direction from neutral the movable member is being operated.

14. A valve comprising inner and outer telescopically arranged members having normally neutral positions with respect to each other, one of said members being shiftable in either direction from its neutral position for controlling flow, an inlet port, an outlet port, two working ports, channels in the members communicating with the respective ports and establishing communication therebetween when said members are in neutral, two chambers, one located at each end of said inner member, the channels in the inner member being provided by a plurality of lands, one located at each end of said inner member adjacent the respective chambers and forming movable walls therefore, the effective area of the movable wall for one chamber being greater than that of the movable wall for the other chamber, passages connecting the chambers to the channels appearing in one of the members, and means for moving said one member from its neutral position.

References Cited in the file of this patent

UNITED STATES PATENTS

| | | |
|---|---|---|
| 1,766,510 | Gregory | June 24, 1930 |
| 1,830,636 | Bragg et al. | Nov. 3, 1931 |
| 2,140,095 | Theed | Dec. 13, 1938 |
| 2,307,910 | Baade | Jan. 12, 1943 |
| 2,345,531 | Ganahl | Mar. 28, 1944 |
| 2,370,137 | Biggert | Feb. 27, 1945 |
| 2,380,705 | Proctor | July 31, 1945 |
| 2,596,242 | Hill | May 13, 1952 |
| 2,598,180 | Kenyon | May 27, 1952 |
| 2,608,263 | Garrison | Aug. 26, 1952 |
| 2,617,257 | Douglas | Nov. 11, 1952 |
| 2,627,847 | Clark et al. | Feb. 10, 1953 |
| 2,655,939 | Tauscher | Oct. 20, 1953 |